United States Patent
Stuntebeck et al.

(10) Patent No.: US 9,385,783 B2
(45) Date of Patent: *Jul. 5, 2016

(54) METHOD AND APPARATUS FOR USING IN-HOME POWER LINES TO SUPPORT LOW POWER WIRELESS SENSORS AND TO EXTEND THE RANGE OF LOW-POWER WIRELESS DEVICES

(71) Applicants: GEORGIA TECH RESEARCH CORPORATION, Atlanta, GA (US); UNIVERSITY OF WASHINGTON, Seattle, WA (US)

(72) Inventors: Erich P. Stuntebeck, Atlanta, GA (US); Thomas M. Robertson, Atlanta, GA (US); Gregory D. Abowd, Atlanta, GA (US); Shwetak N. Patel, Seattle, WA (US)

(73) Assignees: Georgia Tech Research Corporation, Atlanta, GA (US); University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,831

(22) Filed: Jun. 6, 2014

(65) Prior Publication Data
US 2015/0099463 A1  Apr. 9, 2015

Related U.S. Application Data

(63) Continuation of application No. 13/050,513, filed on Mar. 17, 2011, now Pat. No. 8,788,191.

(60) Provisional application No. 61/315,141, filed on Mar. 18, 2010.

(51) Int. Cl.
*G01C 21/00* (2006.01)
*H04B 5/00* (2006.01)
*H04W 52/02* (2009.01)

(52) U.S. Cl.
CPC .......... *H04B 5/0018* (2013.01); *H04W 52/0219* (2013.01)

(58) Field of Classification Search
CPC combination set(s) only.
See application file for complete search history.

(56) References Cited

U.S. PATENT DOCUMENTS

| | | |
|---|---|---|
| 4,804,957 A | 2/1989 | Selph et al. |
| 4,858,141 A | 8/1989 | Hart et al. |

(Continued)

FOREIGN PATENT DOCUMENTS

| | | |
|---|---|---|
| CN | 20121017 | 3/2009 |
| DE | 102007032053 A1 | 1/2009 |
| WO | WO-2009081407 A2 | 7/2009 |

OTHER PUBLICATIONS

Beigl, M., ZimmerT., Krohn, A., Decker, C., and Robinson P., Smart-Its—Communication and Sensing Technology for UbiComp Environments, Technical Report ISSN 1432-7864, Mar. 2002.

(Continued)

*Primary Examiner* — Thomas Tarcza
*Assistant Examiner* — Edward Pipala
(74) *Attorney, Agent, or Firm* — Perkins Coie LLP

(57) ABSTRACT

Disclosed is a system that uses existing power line infrastructure in a building as a distributed reception antenna capable of receiving signals from very low-power wireless sensors, thus allowing these sensors to be detected at ranges that are otherwise impractical with over-the-air reception. Also disclosed is a wireless sensor platform that is able to be sensed throughout a building with very low current draw. The disclosed technique may also be utilized to extend the range of mid-frequency consumer electronic devices by leveraging the power line as a reception antenna.

25 Claims, 8 Drawing Sheets

(56) References Cited

U.S. PATENT DOCUMENTS

| | | | |
|---|---|---|---|
| 5,409,037 | A | 4/1995 | Wheeler et al. |
| 5,441,070 | A | 8/1995 | Thompson |
| 5,635,895 | A | 6/1997 | Murr |
| 6,720,922 | B2 | 4/2004 | Williams et al. |
| 6,728,646 | B2 | 4/2004 | Howell et al. |
| 6,839,644 | B1 | 1/2005 | Woods et al. |
| 6,853,291 | B1 | 2/2005 | Aisa |
| 7,043,380 | B2 | 5/2006 | Rodenberg, III et al. |
| 7,276,915 | B1 | 10/2007 | Euler et al. |
| 7,400,986 | B2 | 7/2008 | Latham et al. |
| 7,460,930 | B1 | 12/2008 | Howell et al. |
| 7,493,221 | B2 | 2/2009 | Caggiano et al. |
| 7,532,896 | B2 | 5/2009 | Friday et al. |
| 7,546,214 | B2 | 6/2009 | Rivers, Jr. et al. |
| 7,660,591 | B1 | 2/2010 | Krishnakumar et al. |
| 8,392,107 | B2 | 3/2013 | Patel et al. |
| 8,494,762 | B2 | 7/2013 | Patel et al. |
| 8,788,191 | B1 | 7/2014 | Stuntebeck et al. |
| 2001/0003286 | A1 | 6/2001 | Philippbar et al. |
| 2002/0010690 | A1 | 1/2002 | Howell et al. |
| 2002/0022991 | A1 | 2/2002 | Sharood et al. |
| 2003/0050737 | A1 | 3/2003 | Osann |
| 2003/0088527 | A1 | 5/2003 | Hung et al. |
| 2003/0193405 | A1 | 10/2003 | Hunt et al. |
| 2004/0128034 | A1 | 7/2004 | Lenker et al. |
| 2004/0140908 | A1 | 7/2004 | Gladwin et al. |
| 2004/0206405 | A1 | 10/2004 | Smith et al. |
| 2005/0060107 | A1 | 3/2005 | Rodenberg et al. |
| 2005/0067049 | A1 | 3/2005 | Fima |
| 2006/0009928 | A1 | 1/2006 | Addink et al. |
| 2006/0152344 | A1 | 7/2006 | Mowery |
| 2006/0195275 | A1 | 8/2006 | Latham et al. |
| 2006/0245467 | A1 | 11/2006 | Casella et al. |
| 2008/0079437 | A1 | 4/2008 | Robarge et al. |
| 2008/0086394 | A1 | 4/2008 | O'Neil et al. |
| 2008/0224892 | A1 | 9/2008 | Bogolea et al. |
| 2008/0255782 | A1 | 10/2008 | Bilac et al. |
| 2009/0072985 | A1 | 3/2009 | Patel et al. |
| 2013/0201033 | A1 | 8/2013 | Cohn et al. |

OTHER PUBLICATIONS

Cohn et al., "SNUPI: Sensor Nodes Utilizing Powerline Infrastructure," Proceedings of the 12th ACM International Conference on Ubiquitous Computing, Sep. 26-29, 2010, pp. 159-168.
Froehlich, J., Everitt, K., Fogarty, J., Patel, S., Landay, J., Sensing; Opportunities for Personalized Feedback Technology to Reduce Consumption. UW CSE Technical Report: CSE Sep. 13, 2001, 7 pages. 2009.
Hightower, J. and Borriello, G., A Survey and Taxonomy of Location Systems for ; Ubiquitous Computing, University of Washington Tech Report CSC—Jan. 8, 2003, ; 29 pages. 2001.
Weka 3: Data Mining Software in Java. http://www.cs.waikato.ac.nz/ml/weka/. Mar. 2006.
Active Bat, The BAT Ultrasonic Location System, web.archive.org/web/20050828174711http://www.uk.research.att.com/batl. 2005, 3 pages.
Ananthaswamy, A., "March of the Motes: An Unseen Silicon Army is Gathering Information on Earth and Its Inhabitants. It's not an Alien Reconnaissance Mission: Smart Dust is Finally Hitting the Streets," New Scientist, vol. 179, issue 2409, 2003 8 pages.
Arvola, et al., "Billing Feedback as a Means to Encourage Household Electricity Conservation: A Field Experiment in Helsinki," Proceedings of the 1993 Summer Study of the European Council for Energy Efficient Economy. 2003, 11 pages.
Bahl et al., "RADAR: An In-Building RF-Based User Location and Tracking System," In the Proceedings of Infocom., 2000, 10 pages.
Beckmann et al., "Some Assembly; Required: Supporting End-User Sensor Installation in Domestic Ubiquitous Computing Environments," In the Proceedings of Ubicomp 2004, 2004, 18 pages.
Brandon et al., "Reducing Household Energy Consumption: A ; Qualitative and Quantitative Field Study," Journal of Environmental Psychology, 1999, 11 pages.
Castro et al., "A Probabilistic Room Location Service for Wireless Networked Environments," In the Proceedings of Ubicomp 2001, 2001, 19 pages.
Chen et al., "Bathroom Activity Monitoring Based on Sound," In the Proceedings of Pervasive 2005, 2005, 15 pages.
Chetty et al., "How Smart Homes Learn: The Evolution of the Networked Home and Household," In the Proceedings of Ubicomp, 2007, 18 pages.
Cook et al., "SoC Issues for RF Smart Dust—Wireless sensor nodes, each a self-powered system performing sensing, communication, and computation, form reliable mesh networks coordinating efforts to add intelligence to the enviroment," Proceedings ; of the IEEE, vol. 94, No. 6, 2006, 20 pages.
Darby, S., "The Effectiveness of Feedback on Energy Consumption," Environmental Change Institute, University of Oxford, 2006, 24 pages.
Fischer, C., "Feedback on Household Electricity Consumption: A Tool for ; Saving Energy?" Energy Efficiency, 2008, 26 pages.
Fogarty, J., "Sensing from the Basement: A Feasibility Study of Unobtrusive and Low-Cost Home Activity Recognition," In the Proceedings of ACM Symposium on User Interface Software and Technology (UIST 2006), 2006, 10 pages.
Froehlich et al., "Sensing Opportunities for Personalized Feedback Technology to Reduce Consumption," UW CSE Technical Report: CSE Sep. 13, 2001, 2009, 8 pages.
Hamerly et al., "Learning the K in k-ink-means," In the Proceedings of the Seventeenth Annual Conference Neural Information Processing Systems (NIPS), 2003, 8 pages.
Hazas et al., "A Novel Broadband Ultrasonic Location System," In the Proceedings of Ubicomp 2002, 2002, 17 pages.
Hazas et al., "Broadband ultrasonic location systems for improved indoor positioning," IEEE Transactionson Mobile Computing, 2006, 12 pages.
Kjaergaard, M., "A Taxonomy for Radio Location Fingerprinting," In the Proceedings of the Third International Symposium on Location and Context Awareness (LoCA 2007), 2007, 18 pages.
Koile et al., "Activity Zones for Context-Aware Computing," In the Proceedings of UbiComp 2003, 2003, 18 pages.
Krumm et al., "RightSPOT: A Novel Sense of Location for a Smart Personal Object," In the Proceedings of Ubicomp 2003. 2003, 8 pages.
Laasonen, K., "Clustering and Prediction of Mobile User Routes from Cellular Data," In the Proceedings of Principles and Practice of Knowledge Discovery in Database, 2005, 8 pages.
Lamming et al., "SPECs: Another Approach to Human Context and Activity Sensing Research, Using Tiny Peer-to-Peer Wireless Computers," In the Proceedings of Ubicom, 2003, 8 pages.
O'Connell et al., "Location in the; Aware Home," Position paper for Workshop on Location Modeling for; Ubiquitous Computing at Ubicomp, 2001, 4 pages.
Parker et al., "Contract Report: Pilot Evaluation of Energy Savings from Residential Energy Demand Feedback Devices," Florida Solar Energy Center, A Research Institute of the University of Central Florida, 2008, 32 pages.
Patel et al., "Detecting Human Movement by Differential Air Pressure Sensing in HVAC System Ductwork: An Exploration in Infrastructure Mediated Sensing," In the Proceedings of Pervasive 2008, 2008, 18 pages.
Patel, S., Robertson, T., Kientz, J., Reynolds, M., Abowd, G., At the; Flick of a Switch: Detecting and ClassifYing Unique Electrical Events on the Residential Power Line, In the Proceedings of Ubicomp 2007, pp. 271-288, 2007.
Patel, S., Supporting Location and Proximity-Based Studies in Natural Settings, Adjunct Proceedings of Pervasive 2007, 2007, 9 pages.
Patel, S., Truong, K., Abowd, G., PowerLine Positioning: A Practical; Sub-Room-Level Indoor Location System for Domestic Use, In the; Proceedings Ubicomp 2006, pp. 441-458. 2006.
Rekimoto et al., "CyberCode: Designing Augmented Reality Environments with Visual Tags," In the Proceedings of Designing Augmented ; Reality Environments, 2000, 10 pages.
"Study Finds Elder Care a Growing Emotional and Financial Burden; for Baby Boomers New ADT Monitoring Service for Elderly Helps Ease the Stress of Long Distance Care Giving," http://www.

(56) References Cited

OTHER PUBLICATIONS prnewswire.com/news-releases/study-finds-elder-care-a-growing-emotional-and-financial-burden-for-baby-boomers-54366192. html?$G1Ref, 2005, 3 pages.

Tapia et al., "The Design of a Portable Kit of Wireless Sensors for Naturalistic Data Collection," In Proceedings of Pervasive, 2006, 19 pages.

Tapia et al., "Activity Recognition in the Home Setting Using Simple and Ubiquitous Sensors," In the Proceedings of Pervasive 2004, 2006, 18 pages.

Ueno et al., "Effectiveness of Displaying Energy Consumption Data in Residential Houses, Analysis on How the Residents Respond," ECEEE 2005 Summer Study—What Works and Who Delivers?, 2005, 11 pages.

Want et al., "The Active Badge Location System," ACM Transactions on Information Systems, vol. 10, Olivetti Research Ltd., Cambridge, England, 1992, 10 pages.

Ward et al., "A New Location Technique for the Active Office," IEEE Personal Communications, Oct. 1997, 6 pages.

Weka 3: Data Mining Software in Java. http://www.cs.waikato.ac.nz/ml/weka/ Mar. 2006, 1 page.

Wren, C. and Munguia-Tapia, E., "Toward Scalable Activity Recognition for Sensor Networks" In the Proceedings of LoCA 2006, 2006, 18 pages.

Beigl, M., Zimmer T., Krohn, A., Decker, C., and Robinson P., Smart-Its—Communication and Sensing Technology for UbiComp Environments, Technical Report ISSN 1432-7864. Mar. 2002.

"Cricket v2 User Manual," Cricket Project, MIT Computer Science and Artificial Intelligence Lab, Cambridge, MA 02139, http://cricket.csail.mlt.edu, Jan. 2005, 57 pages.

"Crossbow's New ZigBee-Ready, 802.15.4 Radio-Compliant MICAz Mote an Instant Hit," Business Wire, A Berkshire Hathaway Company, Aug. 18, 2004, 2 pages.

Darby, S., "Making it Obvious: Designing Feedback into Energy Consumption," Proceedings of the Second International Conference on Energy Efficiency in Household Appliances and Lighting, 2000, 12 pages.

"Ekahau Deploys a First Mobile Tracking Solution in Madrid Public Transport Complex," RTLS Installation for Consorcio Regional de Transportes de Madrid Provides, Nov. 15, 2007, 3 pages.

"Ekahau Upgrades Site Survey to Refine Wi-Fi Network Planning and Administration," http://www.mobilitytechzone.com/news/2007/11/17/3103098.htm, Nov. 17, 2007, 2 pages.

Hightower, J. and Borriello, G.," A Survey and Taxonomy of Location Systems for Ubiquitous Computing," University of Washington Tech Report CSC—Aug. 24, 2001, 29 pages.

Hirsch, T., Forlizzi, J., Hyder, E., Goetz, J., Kurtz, C., Stroback, J., "The ELDer Project: Social and Emotional Factors in the Design of Eldercare Technologies," Conference on Universal Usability 2000, 8 pages.

HomePlug Powerline Alliance, Powerline Networking—Coming Soon to Your TV: HomePlug AV, web.archive.org/web/20060303084808/www.homeplug.rog/en/products/experience—, 2 pages, 2006.

HomePlug Powerline Alliance, Powerline Networking: The HomePlug Experience, web.archive.org/web/20060225110208/www.homeplug.org/en/products/index.asp, 2 page, Feb. 2006.

HomePlug Powerline Alliance, Welcome to the HomePlug Powerline Alliance, web.archive.org/web/20060225110201/www.homeplug.org/en/index.asp, 2006, 1 page, Feb. 2006.

HomePlug Powerline Alliance, Powerline Networking—Analysts Agree! HomePlug is here to stay! web.archive.org/web/20051223071109/www.homeplug.org/en/products/experience_, 2 pages, Dec. 2005.

LaMarca, A., Chawathe, Y., Consolvo, S., Hightower, J., Smith, L, Scott, J., Sohn, T., Howard, J., Hughes, J., Potter, F., Tabert, J., Powledge, P., Borriello, G., and Schilit, B., "Place Lab: Device Positioning Using Radio Beacons in the Wild," In the Proceedings of Pervasive, 18 pages, Aug. 2005.

MacQueen, J., "Some Mathematical Classification and Analysis of Multivariate Observations," In the Proceedings of the Fifth Berkeley Symposium on Mathematical and Probability, 17 pages, Jan. 1967.

Madhavapeddy, A. and Tse, T., "Study of Bluetooth Propagation Using Accurate Indoor Location Mapping," In the Proceedings of Ubicom, pp. 105-122. 2005, Sep. 2005.

Mountain, D., "Summary The Impact of Real-Time Feedback on; Residential Electricity Consumption: The Hydro One Pilot," Mar. 2006, 4 pages.

Orr, R. and Abowd, G. "The Smart Floor: A Mechanism for Natural User Identification and Tracking," In the Proceedings of the Extended Abstracts of CI-II 2000, Apr. 2000, 2 pages.

Otsason, V., Varshaysky, A., LaMarca A., and de Lara, E., "Accurate GSM Indoor Localization," In the Proceedings of UbiComp, 18 pages, Sep. 2005.

Patel, S., Gupta S., and Reynolds M., "The Design and Evaluation of an End-User-Deployable, Whole House; Contactless power Consumption Sensor," CHI 201, —Atlanta, GA, Apr. 10-15, 2010, 10 pages.

Priyantha, N., Chakraborty, A., and Balakrishnan, H., "The Cricket Location-Support System", In the Proceedings of Mobicom, 8 pages, Aug. 2000.

Rekimoto, J., and Katashi, N., "The World Through the Computer: Computer Augmented Inter-action With Real World Environments," In the Proceedings of UIST, Nov. 14-17, 1995, 8 pages.

Ubisense Hardware Datasheet, May 2006, 1 page.

Wellbrook communications—Product Summary: Active Loop Antenna Model ALA 1530, web.archive.org/web/20060521015053/http:www.wellbrook.uk.com/products.html, 3 pages, May 2006.

Yang, Z. and Bobick, A., "Visual Integration from Multiple Cameras," In the Proceedings of WACV/Motion, 6 pages, Aug. 2005.

Ekahau Inc., "Markets and Technical Considerations for Campus-wide Location Systems," 14 pages, Jan. 2000.

Froehlich, J., Sensing and Feedback of Everyday Activities to Promote Environmentally Sustainable Behaviors, Thesis Proposal, Computer Science and Engineering, University of Washington, Jul. 23, 2009, 35 pages.

Mountain, D., "Price Influences Demand," DeGroote School of Business, McMaster University, Jun. 5, 2008, 16 pages.

Patel, S., Gupta S., and Reynolds M., "End-User-Deployable Whole House Contact-Less Power Consumption Sensing," UbiComp Sep. 30-Oct. 3, 2009, 4 pages.

Sensor Transmission Packet

METHOD AND APPARATUS FOR USING IN-HOME POWER LINES TO SUPPORT LOW POWER WIRELESS SENSORS AND TO EXTEND THE RANGE OF LOW-POWER WIRELESS DEVICES

RELATED APPLICATIONS

This application is a continuation of U.S. patent application Ser. No. 13/050,513, filed Mar. 17, 2011, which claims priority to U.S. Provisional Application No. 61/315,141, filed Mar. 18, 2010, both of which are incorporated herein by this reference for all purposes. In addition, U.S. patent application Ser. No. 13/050,513 is related to U.S. patent application Ser. No. 12/560,099, filed Sep. 15, 2009, now U.S. Pat. No. 8,494,762 issued Jul. 23, 2013, which claims priority to U.S. Provisional Patent Applications Ser. Nos. 60/817,225, filed Jun. 28, 2006, and 61/097,006, filed Sep. 15, 2008, and which is a continuation in part of U.S. patent application Ser. No. 11/824,204, filed Jun. 28, 2007 by Patel et al. which claims priority to U.S. Provisional Application No. 60/817,225, filed Jun. 28, 2006, the subject matters of each being incorporated herein by this reference for all purposes.

FIELD OF THE INVENTION

The present invention relates generally to wireless sensor systems and devices, and more particularly, to the use of in-home power lines to transduce signals from wireless sensors and devices.

BACKGROUND OF THE INVENTION

According to basic electromagnetic theory, a time-varying current in a wire will produce an associated time-varying electromagnetic field around the wire, and a time varying electromagnetic field near a wire will produce an associated current in that wire. This is the basic premise of all antennas. Since the power lines in a home are essentially a collection of wires, they may potentially be used as antennas. Additionally, the antenna reciprocity theorem tells us that any antenna is an equally good transmitter or receiver.

The use of a power line as an RF antenna has been explored in various contexts as far back as the 1920's. Several patents describe various forms of a line cord antenna, whereby a receiver is coupled to the power line to receive high-powered broadcasts originating outside the home from TV and radio stations. Power lines have also been examined as transmitting antennas, which are further categorized for regulatory purposes as intentional or unintentional radiators of electromagnetic signals. As an intentional radiator, power lines have been used to distribute AM radio broadcast signals over the main power distribution grid. Within a home or other structure, power lines operating as intentional radiators have been used to distribute RF signals at up to 20 MHz for an indoor localization system, for a cordless phone system transmitter, and for an in-home video distribution system transmitter. As unintentional radiators, power lines unintentionally leak radiated RF fields from broadband over power line (BPL) signals. BPL signals are intended to be confined to the power lines, but nonetheless unintentionally radiate RF energy since power lines are not designed to function as radio frequency transmission lines. The development of power line tags (PL-Tags), disclosed in United States Patent Application Publication US 2010/0109842, Ser. No. 12/560,099, showed that the power line could be used as a receiving antenna for detecting low-frequency resonant RF energy from power line activated passive RFID tags.

A consistently emerging theme in ubiquitous computing for the home is that while it is possible to think of the home as a sensor-rich environment, there are practical roadblocks to widespread deployment. Though the research community and others have begun to define more and more compelling applications of sensor enabled environments, many remaining obstacles hinder the adoption of in-home sensors. Power requirements are a frequent source of concern for wireless sensor networks. Wireless sensors are appealing because they can be placed in a wide variety of locations throughout a home, but the high power consumption of most wireless communication technologies limit the sensor's battery life to an undesirably short operating period. Deploying tens or hundreds of wireless sensors in a home will result in an undesirably high maintenance cost due to the battery cost as well as the labor cost required to check and replace the sensor batteries.

Accordingly, there is a need for a wireless communication system that permits building-wide coverage from wireless sensors, while consuming as little battery power as possible from the wireless sensor nodes. The present invention takes advantage of the transduction properties of existing electrical power line infrastructure to allow wireless sensors to operate with very low battery power consumption compared to competing wireless communication approaches.

SUMMARY OF THE INVENTION

Disclosed herein is a technique to drastically reduce the power consumption requirements for transmission within a wireless sensor network. Inspired by prior work showing how the existing infrastructure of a home can be used to simplify whole-house sensing, this technique exploits the existing infrastructure of the domestic power wiring to support communication within a wireless sensor network. The Power Line Positioning (PLP) system, as disclosed in United States Patent Application Publication US 2008/0091345, and the Wideband Power Line Positioning (WPLP) system, as disclosed in United States Patent Application Publication US 2010/0109842, specifically used the in-home power line infrastructure as a transmitting antenna for location tags around the home. PL-Tags showed a short-range, passive RFID-like communication between the power line, as a receiving antenna, and mobile tags.

As disclosed herein, an ultra low-power transmitter contained within a sensor node can wirelessly couple its signals to a power line acting as a receiving antenna. The power line thus acts as an antenna for a gateway receiver providing dense coverage within a home or building. The power requirements for this transmitter are potentially as low as tens of microwatts, which drastically alters the design trade-off for energy consumption in a wireless sensor network. Wireless sensor networks based on competing wireless technologies such as WiFi, Zigbee, or ZWave have a significant limitation because the power consumption of radio transceivers complying with these wireless communication standards dominates the overall power consumption of the sensor node.

In contrast, the disclosed apparatus, system, and techniques greatly reduce power consumption for wireless data transmission in sensor networks. The battery life of a wireless sensor node using this technology would then be dominated by sensor and microprocessor power consumption rather than radio transceiver power consumption. Accordingly, proposed is a new model for building in-home wireless sensor networks that leverages the naturally occurring phenomenon of the existing home power line infrastructure acting as an antenna for sensor devices transmitting at high frequencies such as 27.12 MHz. This system and technique allows wireless sensors to transmit at a much lower output power than would otherwise be necessary to cover a typical house.

Also disclosed herein is a simple low-cost technique for extending the range of mid to high-frequency consumer electronic devices by leveraging the power line as a reception antenna, thereby enabling practical deployments of low-power distributed sensor nodes in the home. Demonstrated herein is the feasibility of using existing in-home electrical wiring to extend the operational range of certain wireless devices. Specifically, a wireless keyboard operating at 27 MHz, which has an operational range of 1.5-2 meters on its own, was extended to work throughout a 3-story 4,000 square foot/371 square meter exemplary structure by coupling the antenna port on its receiver to the power lines. Coupling between the keyboard and the power lines occurred over the air, and coupling at the receiver was accomplished capacitively by simply wrapping a wire connected to the receiver's antenna port several times around a standard electrical device cord plugged into a wall socket. This phenomenon of the power line as a communications infrastructure for inexpensive and low power wireless devices has a variety of interesting potential avenues of research in the home.

The disclosed system uses existing power line infrastructure in a building as a distributed reception antenna capable of receiving signals from very low-power wireless sensors, thus allowing these sensors to be detected at ranges that are otherwise impractical with over-the-air reception from a single antenna located at an arbitrary point in a building. Also disclosed is a wireless sensor platform that may be sensed throughout a building with very low current draw. The disclosed technique may also be utilized to extend the range of mid-frequency consumer electronic devices by leveraging the power line as a reception antenna enabling practical deployments of low-power distributed sensor nodes in the home.

According to one aspect of the disclosure, in a structure having an electrical power line infrastructure disposed therein, a system comprises: A) a receiving apparatus electrically coupled to the electrical power line infrastructure at an electrical node of the electrical power line infrastructure, the receiving apparatus responsive signals of a predetermined frequency band; and B) a source of electromagnetic signals disposed within or proximate to the structure, not electrically connected to the electrical power line infrastructure, but configured to wirelessly transmit electromagnetic signals in the predetermined frequency band to at least one of a plurality of access points of the electrical power line infrastructure.

According to a second aspect of the disclosure, in a structure having an electrical power line infrastructure disposed therein, a method comprises: A) electrically coupling a receiving apparatus to the electrical power line infrastructure at an electrical node of the electrical power line infrastructure, the receiving apparatus responsive signals of a predetermined frequency band; B) disposing a source of electromagnetic signals within the structure; C) wirelessly transmitting electromagnetic signals in the predetermined frequency band from the source to at least one of a plurality of access points of the electrical power line infrastructure; and D) detecting at the receiving apparatus signals from the source within the predetermined frequency band as transduced by the electrical power line infrastructure.

According to a third aspect of the disclosure, in a structure having an electrical power line infrastructure disposed therein, a method comprises A) providing a wireless transmitter, configured to wirelessly transmit electromagnetic signals of a predetermined amplitude over a predetermined distance and within a predetermined frequency band, and a receiving apparatus responsive to signals within the predetermined distance and the predetermined frequency band; B) electrically coupling the receiving apparatus to the electrical power line infrastructure at an electrical node thereof; C) disposing the wireless transmitter within the structure at a distance relative to the receiving apparatus greater than the predetermined distance but within the predetermined distance relative to at least one of a plurality of access points of the electrical power line infrastructure; and D) detecting at the receiving apparatus signals from the wireless transmitter within the predetermined frequency band as transduced by the electrical power line infrastructure.

According to a fourth aspect of the disclosure, in a structure having an electrical power line infrastructure disposed therein, a sensor system comprises: a receiving apparatus electrically coupled to the electrical power line infrastructure at an electrical node thereof and responsive signals of a predetermined frequency band; and a plurality of sensors configured to wirelessly transmit electromagnetic signals over a predetermined transmission distance and within a predetermined frequency band, the sensors disposed within the structure at a distance relative to the receiving apparatus greater than the predetermined transmission distance but within the predetermined distance relative to at least one of a plurality of access points of the electrical power line infrastructure.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
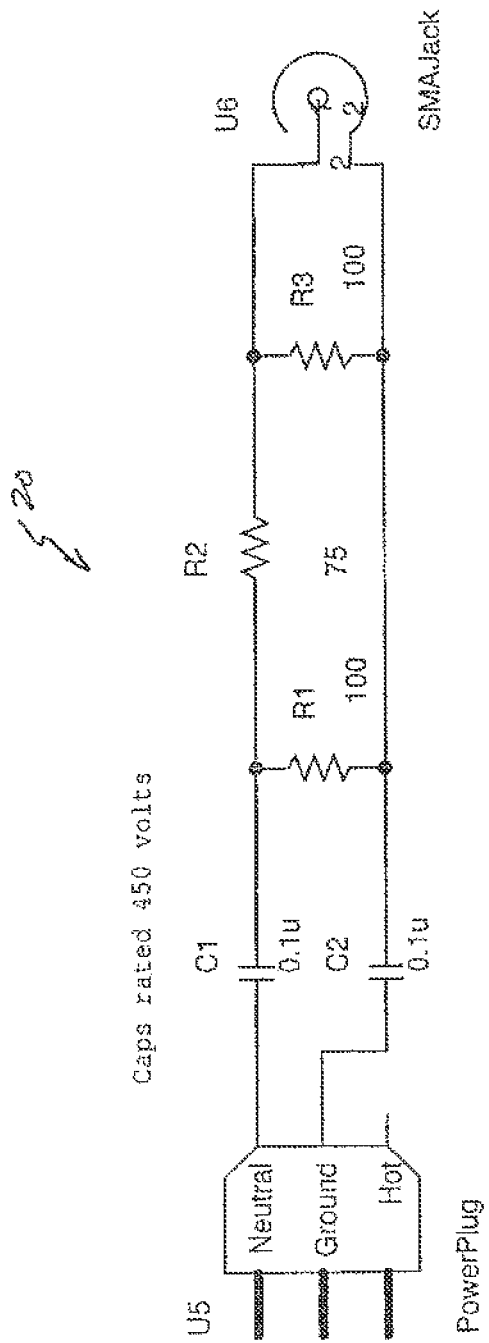
FIG. 1 illustrates a power line coupling box used to connect a high frequency receiver to the power line infrastructure of a building.

Power Line as a High-Frequency Signal Conduit

In accordance with this disclosure, a series of tests of the existing power line infrastructure of a home or other structure have been conducted. In these tests the power wiring of the home or other structure are used as a wired transmission line, with the transmitter and receiver directly connected to the power lines. In these tests measurements were made of the signal propagation attenuation and noise power at frequencies significantly higher than the 60 Hz power signal for which the power lines were designed. In order to act as a conduit for very low power wireless sensors, the power line must be reasonably efficient at conducting signals of the frequency used by the sensor network.

The majority of the radio spectrum is reserved for licensed use, ensuring that wireless services such as mobile telephones, television and radio broadcasting, and radio-navigation services are generally free from interference. The International Telecommunication Union (ITU), a United Nations agency responsible for coordination of the radio spectrum on a global level, has specified several bands of radio spectrum that local governments should make available for unlicensed devices. These spectrum areas are commonly referred to as the Industrial, Scientific, and Medical (ISM) bands. Common ISM devices include WiFi (IEEE 802.11a/b/g) devices, Bluetooth devices such as wireless headsets, and wireless keyboards and mice with proprietary radio protocols. A list of the ITU suggested ISM spectrum allocations are shown in Table 1. Although in some countries, such as the United States, use of spectrum outside of the ISM regions is permitted (for example, under Part 15 of the US Federal Communications Commission regulations), the ISM spectrum allocations are more globally applicable. Note that the 433.92 MHz and 915.00 MHz bands commonly used for inexpensive wireless devices such as garage door openers or wireless security sensors are also not globally available. In accordance with the ITU spectrum plan the following five frequencies are considered for transmission of signals along power lines: 6.78 MHz, 13.56 MHz, 27.12 MHz, 40.68 MHz, and 2.45 GHz.

TABLE 1

ITU specified Industrial, Scientific, and Medical (ISM) spectrum up to 2.4 GHz.

| Center Frequency | Range (MHz) | FCC Regulated Max. Field Strength | FCC Max. EIRP (dBm) |
|---|---|---|---|
| 6.78 MHz [a] | ±0.015 | 15 µV/m @ 30 m | −51.71 dBm |
| 13.56 MHz | ±0.007 | 15,848 µV/m @ 30 m | +8.77 dBm |
| 27.12 MHz | ±0.163 | 10,000 µV/m @ 3 m | −15.23 dBm |
| 40.68 MHz | ±0.020 | 1,000 µV/m @ 3 m | −35.23 dBm |
| 433.92 MHz [b] | ±0.870 | | |
| 915.00 MHz [c] | ±13.000 | | +36.00 dBm [d] |
| 2.45 GHz | ±50.000 | | +36.00 dBm [d] |

[a] Subject to approval by the local regulatory body in the country of interest.
[b] ITU Region 1 only (Europe, Africa, the Middle East west of the Persian Gulf, the former Soviet Union, and Mongolia).
[c] ITU Region 2 only (The Americas, Greenland, and some eastern Pacific Islands).
[d] For digital modulation schemes having bandwidth of at least 500 kHz.

To test the power line as a transmission line at the selected frequencies, a high-frequency coupling box was used to electrically couple a spectrum analyzer to the power line infrastructure professional. FIG. 1 illustrates an electrical schematic of a coupling box 20 in accordance with one embodiment which can be used to connect a high frequency receiver, such as a spectrum analyzer 18 or other receiving device, to the power line while isolating it from the 50-60 Hz power signal. As illustrated, coupling box 20 comprises a standard 3 prong plug U5 connected the power line. A test signal is injected through connector 6 into the power line via a configuration of resistors R1, R2 and R3 and capacitors C1-C2. The coupling box 20 isolates the test equipment from the low frequency, high-voltage power signal, but allows high frequency signals to pass through. Two such coupling boxes were utilized, one to inject a high-frequency signal into the power line using an Agilent E4433B signal generator, and one to measure the received signal with a Rhode & Schwarz FSH8 spectrum analyzer.

The experiments, the results of which are presented in Table 2, were performed first in a 3-story, 371 square meter home built in 2003. Data was obtained by using the signal generator to inject a 0 dBm (1 mW) signal into the power line at each of the five frequencies. The signal generator was connected to the power line via the coupling box plugged into an outlet in the dining room. During the tests the signal generator was powered by a battery operated uninterruptible power supply (UPS) to isolate any signal leakage from its power supply. The received signal strength was then measured using the spectrum analyzer by connecting it to a single, representative outlet in each of nine listed rooms on the three floors. Average attenuation for the ISM frequencies from 6.78 MHz through 40.68 MHz ranged from 47 to 53 dB. At 2.45 GHz, no signal could be detected over the power line in any of the rooms. Given the foregoing, further exploration was limited to 6.78 MHz, 13.56 MHz, 27.12 MHz, and 40.68 MHz. Since, as noted herein, wired-type power line communication devices utilize spectrum from 2 to 28 MHz, interference caused by these devices was tested at the three ISM bands that fall within this range. Two Netgear XET1001 HomePlug-based Ethernet-over-power line devices were utilized along with a laptop to generate traffic over the power line-based network, and the spectrum analyzer to detect interference caused by the XET1001. The device generated significant interference at 6.78 MHz and 13.56 MHz when transmitting data, but the 27.12 MHz band was relatively free of interference from the HomePlug devices.

Table 2 illustrates the received signal strength of a signal directly injected into the power line, as sensed in each of nine rooms of the test home. The signal was injected in the dining room (see FIG. 5) at a power of 0 dBm, thus the numbers in this table represent the amount of attenuation caused by the power line. No signal was detected over the power line in any room for 2.45 GHz. The measured loss induced by the two power line coupling boxes at each frequency was subtracted from these figures to give only the loss caused by the power line.

TABLE 2

| | Signal Strength (dBm) | | | | | | | | |
|---|---|---|---|---|---|---|---|---|---|
| | Basement | | | 1st Floor | | | 2nd Floor | | |
| Frequency (MHz) | Media | Family #2 | Bed #4 | Dining | Kitchen | Family #1 | Master Bed | Bed #2 | Bed #3 |
| 6.780 | −41.2 | −57.5 | −44.9 | −19.2 | −51.6 | −50.8 | −69.0 | −72.0 | −45.5 |
| 13.56 | −56.8 | −60.8 | −61.1 | −33.3 | −53.1 | −55.9 | −57.1 | −54.3 | −50.2 |

TABLE 2-continued

| | Signal Strength (dBm) | | | | | | | | |
|---|---|---|---|---|---|---|---|---|---|
| | Basement | | | 1st Floor | | | 2nd Floor | | |
| Frequency (MHz) | Media | Family #2 | Bed #4 | Dining | Kitchen | Family #1 | Master Bed | Bed #2 | Bed #3 |
| 27.12 | −43.3 | −53.5 | −61.6 | −21.7 | −55.9 | −61.6 | −58.1 | −50.4 | −40.7 |
| 40.68 | −38.3 | −46.2 | −66.7 | −35.5 | −44.6 | −55.2 | −53.9 | −51.6 | −31.1 |
| 2450 | — | — | — | — | — | — | — | — | — |

In light of the foregoing, 6.78 MHz and 13.56 MHz are determined to be less desirable due to interference from HomePlug-based Ethernet-over-power line networks. 433.92 MHz and 915.00 MHz are less desirable since neither band is globally available and each is crowded with consumer devices that might cause interference. 2.45 GHz is less desirable since signals of this frequency were greatly attenuated by the power line. Accordingly, two ISM bands, 27.12 MHz and 40.68 MHz, are considered suitable for wireless transmission coupling.

Exploration of the power line as an antenna for receiving wireless signals is motivated by our Power Line Positioning (PLP) and Wideband Power Line Positioning (WPLP) work, which leverage the power line as the infrastructure for a real-time indoor localization system. PLP and WPLP utilize the power line to wirelessly transmit signals, ranging in frequency from 400 kHz to 20 MHz and produced by one or more signal injector modules plugged into an outlet throughout a home. The principle of reciprocity in antenna design, that is, any given antenna is equally good at receiving and transmitting, suggests that the power line would be a good receiver for at least the 400 kHz-20 MHz range that was explored in the earlier work.

Figure 3:
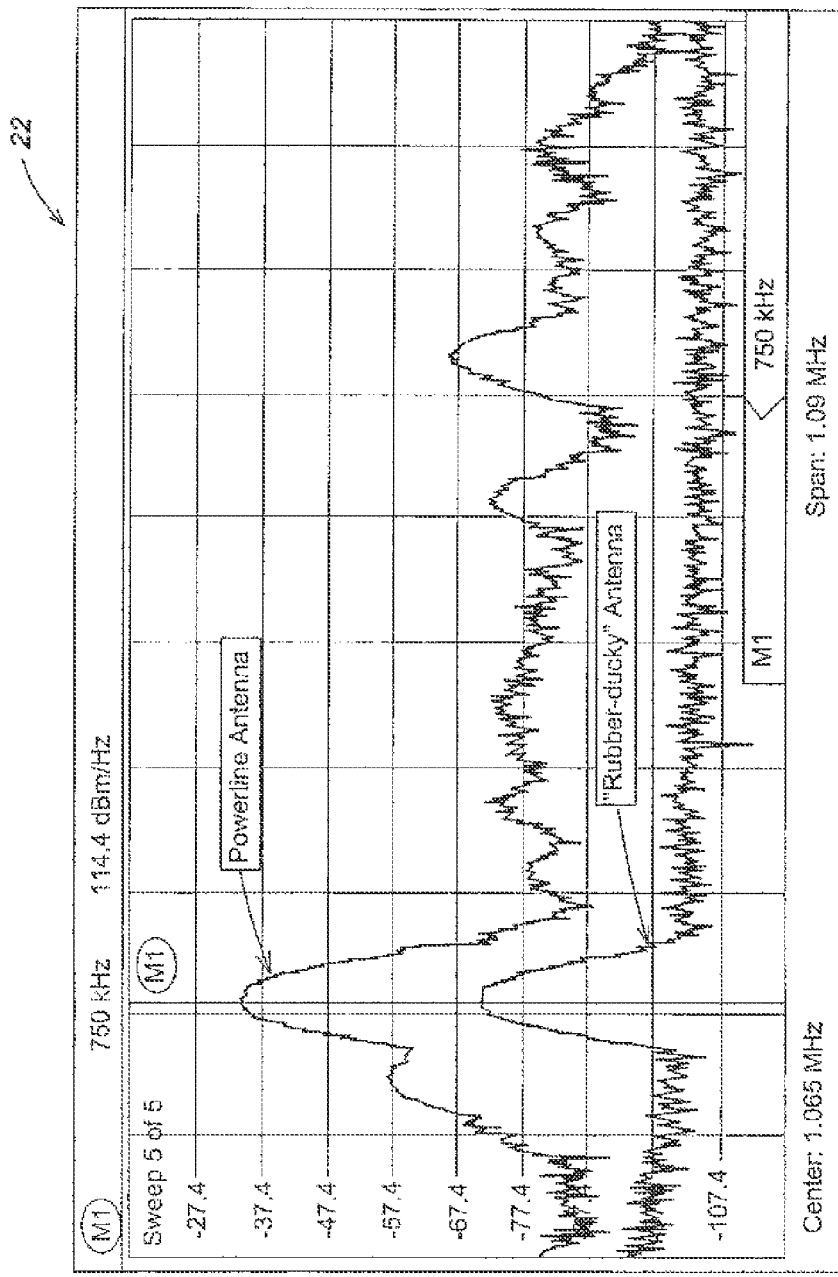
FIG. 3 illustrates the AM radio broadcast spectrum (520-1610 kHz in the US) as sensed by the spectrum analyzer when connected to the power line through the coupling box of FIG. 1.

The capability of a test home's power line to receive signals in the US AM radio broadcast band was verified by connecting a spectrum analyzer to the power line and monitoring the 520-1610 kHz band. The graph 22 of FIG. 3 illustrates the AM radio broadcast spectrum (520-1610 kHz in the US) as sensed by the spectrum analyzer when connected to the power line infrastructure of the home through the coupling box 20. and a standard "rubber ducky" antenna, typical of hand-held radio scanners. Note that AM radio stations are received with much greater signal strength over the power line antenna than with the rubber ducky antenna. A marker is placed at 750 kHz, which is a local AM radio station.

Figure 4:
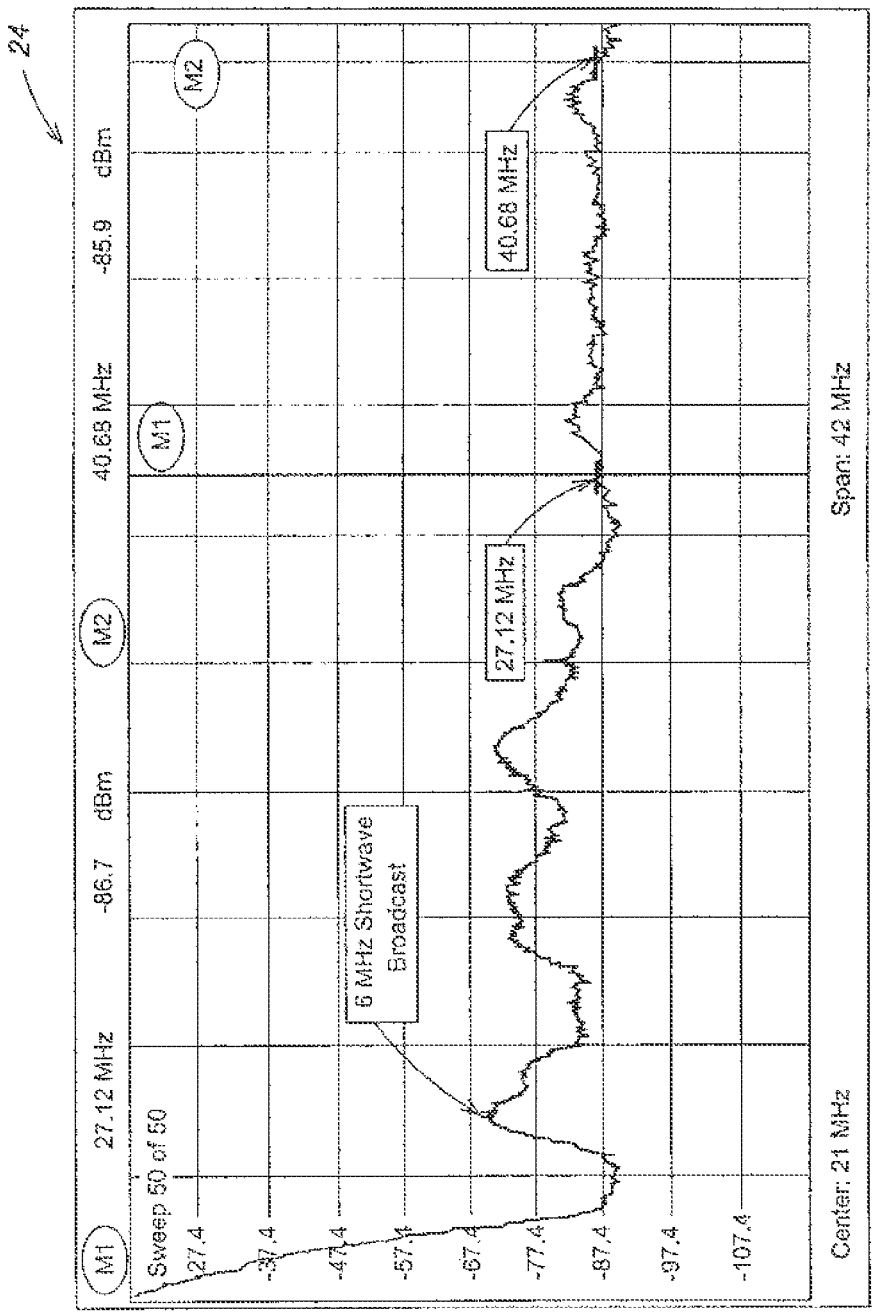
FIG. 4 illustrates the Noise floor of the power line from 100 kHz to 42 MHz of the exemplary structure of FIG. 2, using the coupling box of FIG. 1.

The exploration of the power line as a receiving antenna for low-power wireless signals originating within the home begins by making a final selection of a frequency to explore, between 27.12 MHz and 40.68 MHz, as discussed. Since the objective is to use the power line for receiving very low-power wireless transmissions, a frequency band that is relatively quiet on the power line is selected. The graph 24 of FIG. 4 illustrates the power line background noise from 100 kHz to 42 MHz and specifically points out the two frequencies still in consideration (27.12 MHz and 40.68 MHz). Both of these frequencies fall in relatively quiet regions of the power line, and so background noise levels did not influence the selection of one of these two frequencies within a band of frequencies from 27 MHz to 42 MHz.

Another consideration in selecting a frequency is the size of an efficient antenna at that frequency. For example, although the power line has proven to be a reasonably reliable conduit for signals in the 100 kHz range (X10 and Insteon), frequencies this low are not practical for wireless communication due to the very large size of efficient antennas for these frequencies. Although both X10 and Insteon offer wireless remote controls for operation of any X10 or Insteon-enabled devices, these wireless remotes operate at higher frequencies (310 MHz in the US, under FCC Part 15 regulations) and do not directly couple with the power line—a bridge between the high-frequency wireless channel and the low-frequency power line channel is needed. This is because the size of an efficient antenna at any given frequency is proportional to the wavelength of the signal. A common antenna design is the ½λ or ¼λ dipole, where λ represents the wavelength of the frequency at which the antenna is designed to operate. At 120 kHz, a ¼λ dipole antenna would be 625 m long. In contrast, the higher frequencies utilized by HomePlug devices (2-28 MHz) are much more applicable to wireless communication. As a comparison, a ¼λ dipole antenna at 28 MHz is 2.7 m, vs. 625 m at 120 kHz. The shorter wavelength of these higher frequencies is important in that the transmitting antenna for wireless sensors can be smaller, and also in that a typical home will contain numerous segments of power line in the walls on the order of several meters, but certainly no segments of hundreds of meters.

Ultimately, the frequency of 27.12 MHz was selected as the optimal frequency for power line based low-power wireless signal reception due to regulatory constraints. Revisiting Table 1, the third and fourth columns now become important. Within each frequency band, the FCC has specified a maximum power at which devices may operate. This is typically specified as a maximum field strength in pV/m at some distance from the transmitter. Equation 1 hereafter expresses the electric field as a function of the transmitter power (PT), the antenna gain (TG), and the distance from the transmitting antenna (r).

Figure 2:
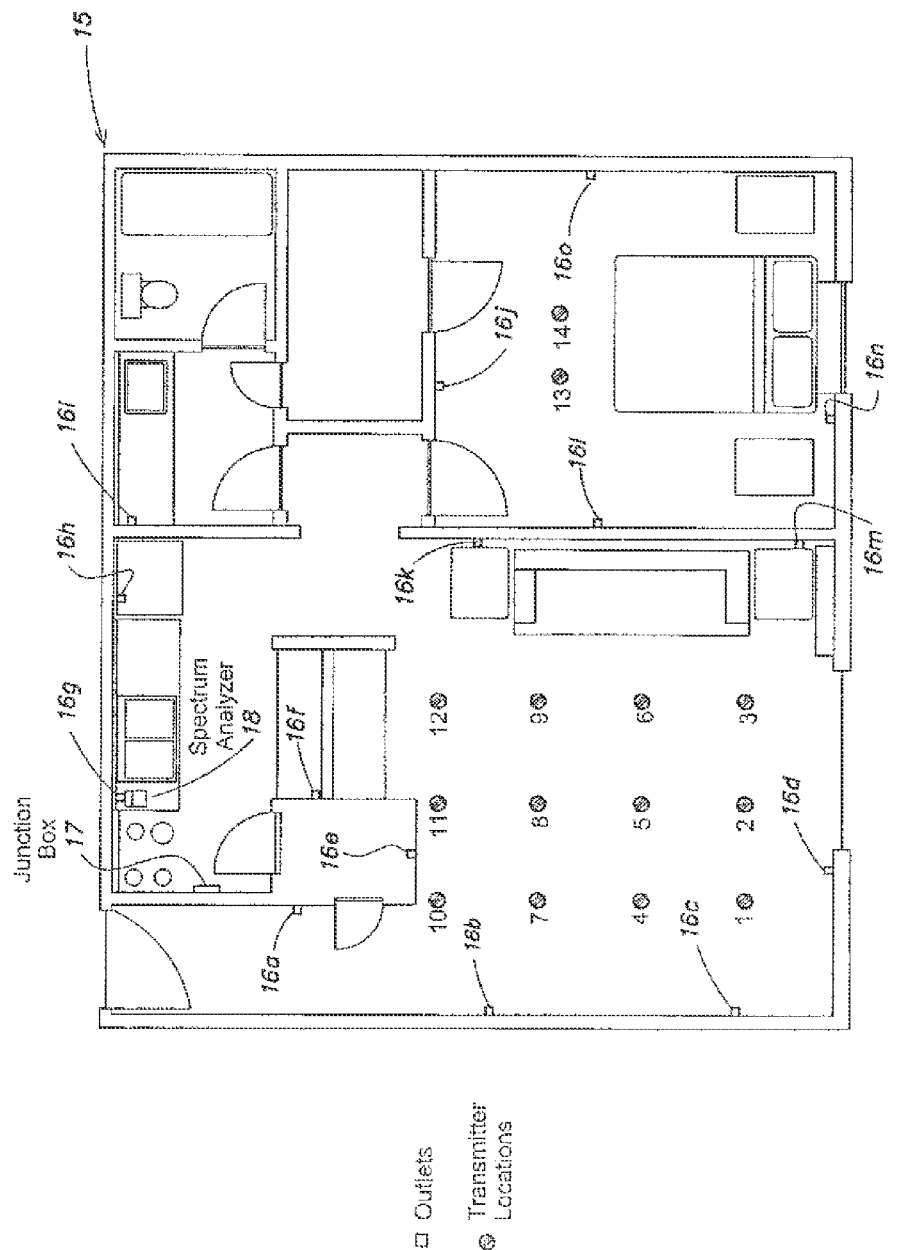
FIG. 2 illustrates the floor plan of an exemplary structure, with numbered dots indicating test points for the Signal-to-Noise Ratio map of FIG. 5.

As noted, the graph 24 of FIG. 4 illustrates a noise floor of the power line from 100 kHz to 42 MHz using the coupling box 20 and the R&S FSH-8 spectrum analyzer 18. The sample was taken in the kitchen of the test home, as shown in FIG. 2. The peaks generally represent various radio broadcasts from outside the home. The second from left, for example, is a 6 MHz shortwave-radio AM broadcast. Note that the noise floor is artificially raised by several dB when sampling such a large chunk of spectrum at once. FIG. 2 illustrates a floor plan of an exemplary structure 15, here an apartment unit, used for tests. The building was constructed in approximately 1969 and the apartment is approximately 37 square meters. In FIG. 2, numbered dots 1-14, indicate test points for the map of FIG. 5. Also illustrated within the structure 15 of FIG. 2 are access points 16a-p to the power line infrastructure within the unit, such access points being either electrical outlets or wall switches, as well as the location of junction box 17 and spectrum analyzer 18, used as the receiving device for signals transduced by the power line infrastructure during testing. T

TABLE 3

ITU specified Industrial, Scientific, and
Medical (ISM) spectrum up to 2.4 GHz.

| Center Frequency | Range (MHz) | Potential for Power line-based Low-power Wireless Communication |
|---|---|---|
| 6.78 MHz | ±0.015 | Rejected: HomePlug devices interfere. |
| 13.56 MHz | ±0.007 | Rejected: HomePlug devices interfere. |
| 27.12 MHz | ±0.163 | Selected. |
| 40.68 MHz | ±0.020 | Rejected: FCC regulated maximum output power too low (−35.23 dBm). |
| 433.92 MHz | ±0.870 | Rejected: Not globally available. |
| 915.00 MHz | ±13.000 | Rejected: Not globally available. |
| 2.45 GHz | ±50.000 | Rejected: Experiments show power line does not carry signals of this frequency. |

$$E = \frac{\sqrt{30 P_T G_T}}{r} \text{ Volts/meter} \quad (1)$$

$$P_T = \frac{E^2 r^2}{30} \quad (2)$$

Power in radio systems is often quoted as EIRP (Effective Isotropic Radiated Power), which refers to the power output of the system from a hypothetical isotropic antenna (a point-source which radiates equally in all directions). The EIRP from Equation 1 can be calculated by setting GT to 1 and rearranging to solve for PT, giving Equation 2. These equations are how the fourth column of Table 1 was calculated. This column provides us with a good estimate of the maximum output power a wireless transmitter can have at each of these frequencies and still be within regulations. 40.68 MHz was ultimately eliminated from consideration based on this band's very low output power constraint of −35.23 dBm, Table 3 reflects the reasoning that leads to a selection of 27.12 MHz as the frequency for a very low-power wireless sensor network.

Strictly over-the-air communication was not possible at 27.12 MHz throughout the test structure. A transmitter was configured, which consisted of a signal generator, producing a 27.12 MHz carrier signal at −35 dBm (0.32 NW) and AM modulated with a 550 Hz tone, connected to a 27 MHz Citizens' Band antenna that was placed close to an outlet in the dining room. The receiver consisted of a hand-held radio scanner (a RadioShack PRO-97) tuned to 27.12 MHz and used to listen to the 550 Hz tone. A quick survey of the test home using the "rubber-ducky" antenna that came with the scanner was performed.

Where the 550 Hz tone can be heard clearly, the 27.12 MHz carrier signal is considered to be strong enough; where the tone cannot be heard indicates that the signal is too weak to be detected there. It was observed that outside of the dining room/foyer area where the transmitting antenna was placed, the signal was generally too weak to be detected by the scanner. When bringing the scanner's antenna close to an outlet, wall switch, or other plugged-in electrical device, the signal could be heard faintly. This indicates that the 27.12 MHz signal coupled from the transmitting antenna onto the power line and was being radiated, albeit weakly, by the power line at various other points in the home. In practice, the receiver may be connected directly to the power line, so the next step was to connect the scanner to the power line via the coupling box of FIG. 1. This process was repeated at a variety of outlet locations throughout the home and noted that the signal could be easily detected in every room of the home by directly connecting to the power line. Not every outlet resulted in good reception, but the vast majority of outlets were satisfactory.

An experimental equipment configuration for initial testing of the power line as a receiving antenna comprised a signal generator electrically isolated by being placed on a plastic cart and powered by a UPS. A 27 MHz antenna (a Cobra HG A1000 designed for Citizens' Band radio use) was used to transmit a 27.12 MHz signal AM modulated at 550 Hz and at a power of −35 dBm (0.32 pW).

The above empirical evidence suggesting that the 27.12 MHz signal coupled to the power line over the air, a determination was made as to how far away the transmitting antenna could be from the power line and still be sensed by a power line connected receiver at most outlets within the home. The antenna was moved away from an outlet in increments of 2.5 cm and used the power line coupled scanner to check for the signal at various outlets throughout the home. It was determined that a transmitter output power of −35 dBm, the antenna could be up to 60 cm away from the outlet before the signal was too weak to be detected by the receiving scanner. Generally, the further the antenna was away from the power line, the weaker the signal detected by the scanner. Coupling is not limited to outlets, however. A similar effect could be observed by bringing the transmitting antenna close to other electrical wiring, such as a wall switch. As a final test, it was observed that some of the outlets in the test home served as particularly good coupling locations for the receiver 18. One of these, located in the basement, is near to the circuit breaker for the entire house, and so is in close proximity to every circuit in the home as result. Connecting the receiver to this outlet allowed testing the range of the transmitting antenna in a best-case scenario.

Figure 5:
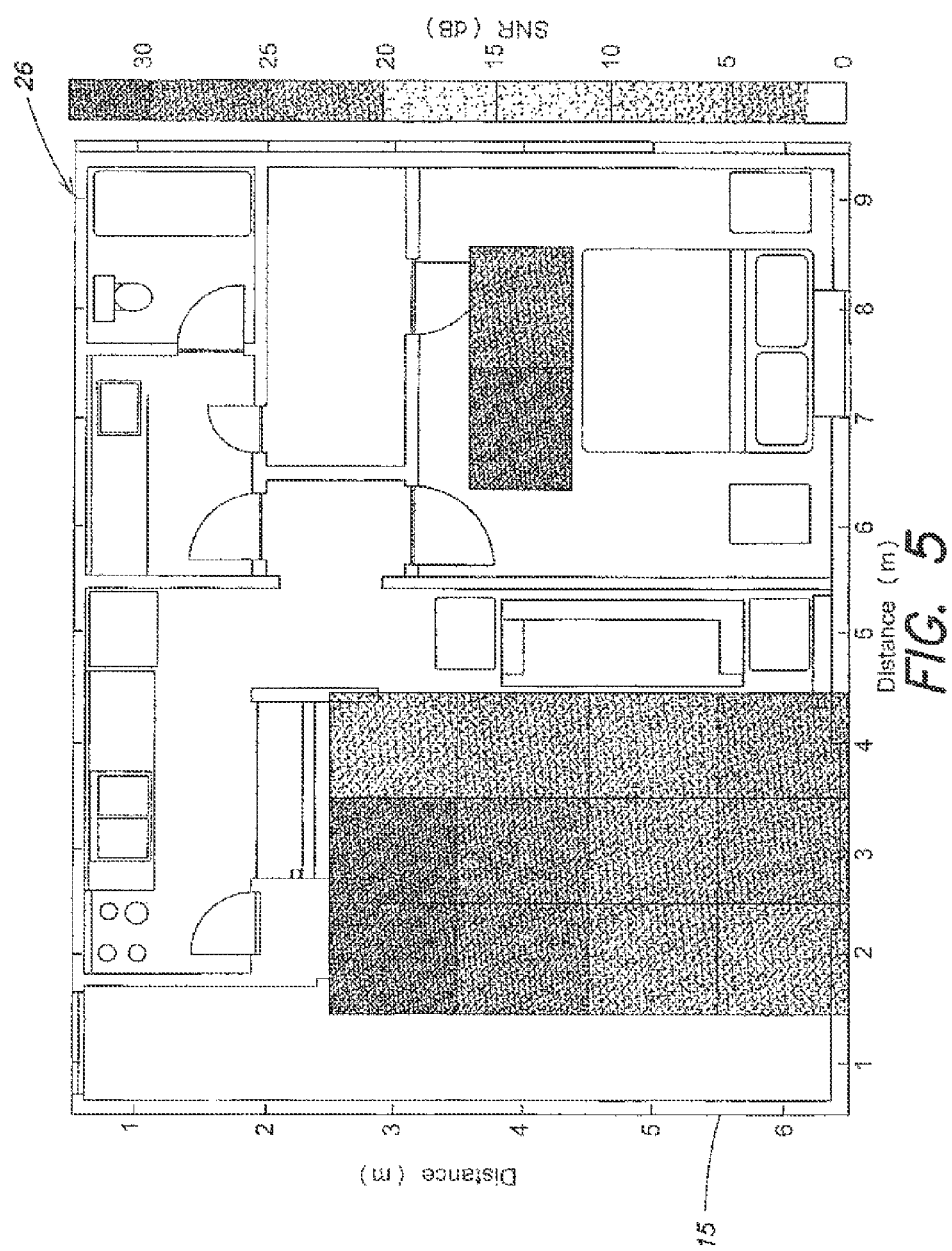
FIG. 5 illustrates a map of the exemplary structure of FIG. 2 indicating the Signal-to-Noise Ratio (SNR) for a 27.12 MHz wireless transmitter at each indicated location as received by a fixed power line coupled receiver in the kitchen.

FIG. 5 illustrates a heat-map 26 of the test structure 15 indicating the Signal-to¬ Noise Ratio (SNR) for a 27.12 MHz wireless transmitter located at each of transmitter locations 1-14 of FIG. 2 as received by a fixed power line coupled receiver in the kitchen. The transmitter utilized an output power of 35 dBm (0.32 pW) and a custom-built 27 MHz loop antenna. While there are some important limitations to this test (measurements were taken from a fixed height of approximately one foot off the ground), it does reveal great promise for using this solution to support a whole-house wireless sensing solution, the larger systems issues of whole-house, low-power sensing discussed in the next section.

Whole-House, Low-Power Sensing Apparatus

Figure 6:
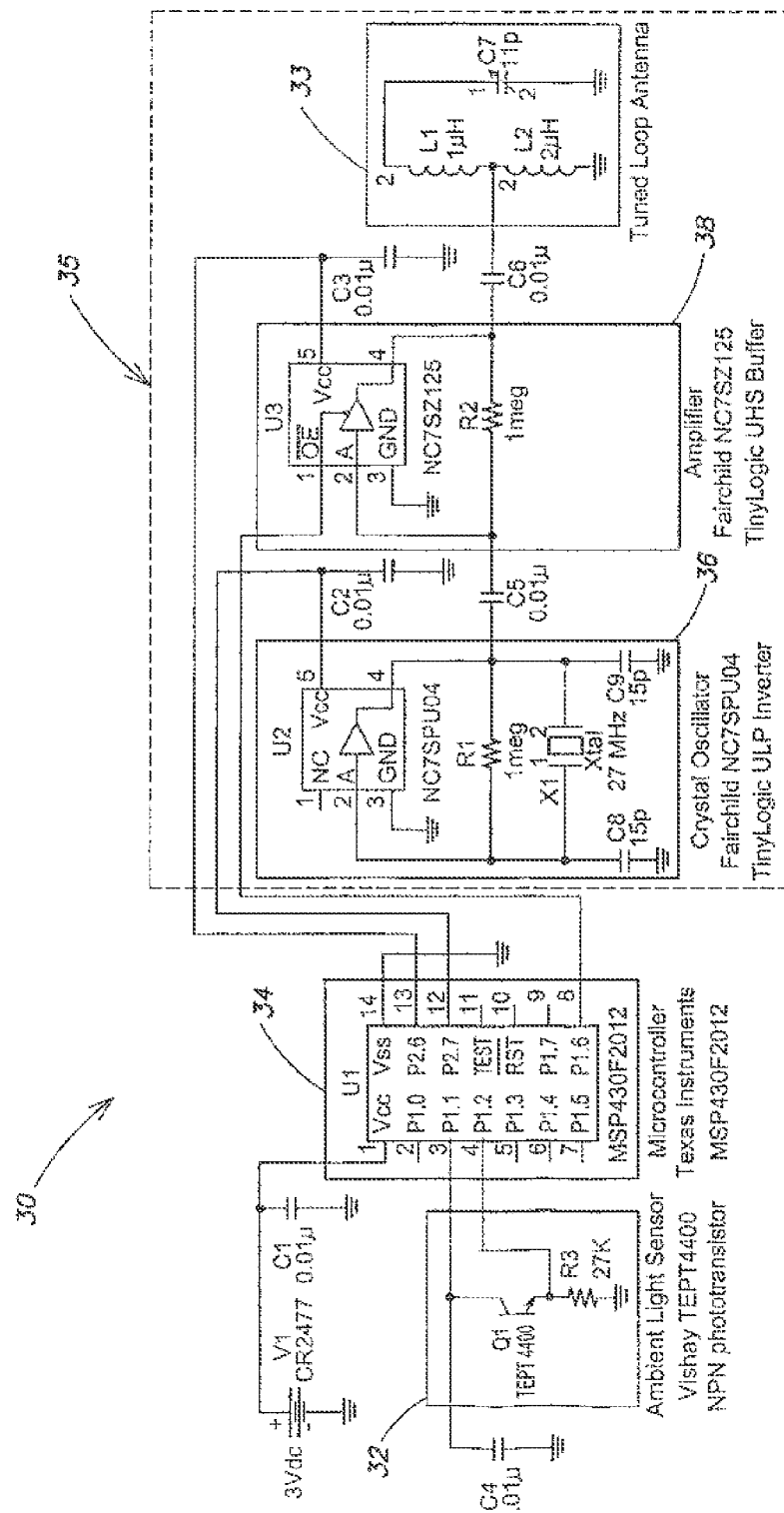
FIG. 6 illustrates a circuit diagram of power line-based wireless sensor in accordance with one embodiment of the disclosure.

The ability of the power line infrastructure within a structure to receive and transmit radio frequency signals, facilitates the use of one or more low-power sensors within the home to construct comprehensive sensor networks. FIG. 6 illustrates a circuit diagram of one embodiment of a power line-based wireless sensor 30. In the illustrative embodiment sensor 30 comprises a microcontroller 34 with an attached sensor transducer 32 and a custom-built 27 MHz radio 35. The radio 35 comprises a 27.12 MHz crystal 36 with a low-power amplifier 38 and a tuned loop antenna 33. The crystal 36 and amplifier 38 could be turned on and off by adjusting the voltage on a control pin, which is driven by the microcontroller's serial bus output. A microcontroller suitable for use a microcontroller 34 is commercially available from Texas Instruments, Dallas, Tex., model MSP430. A crystal oscillator 36 suitable for use with radio 35 is commercially available from Fairchild Semiconductor, San Jose, Calif. 95134, model number NC7SPU04. Similarly, an amplifier suitable for use with radio 35 is commercially available from Fairchild Semiconductor, model number NC7SZ125.

In the illustrative sensor embodiment of FIG. 6, sensor transducer 32 may be implemented with an ambient light sensor. An ambient light sensor component suitable for use as sensor transducer 32 is the Vishay TEPT4400 NPN photo transistor, commercially available from Vishay Electronics, Shelton, Conn. 06484. It will be obvious to those reasonably skilled in the relevant arts that other optical sensors may be equally utilized as sensor transducer 32, as well as any other type of sensor transducer, including, but not limited to, sensor transducers of different types, including those measuring temperature, vibration, moisture, sound, etc.

An On-Off-Keying (OOK) modulation scheme may be used for transmitting data from sensor 30. On-Off-Keying—wherein the transmitter is on to transmit a binary value of one and off to transmit a binary value of zero—is a very simple modulation scheme for low power devices. In an exemplary embodiment, the sensor 30 transmits a packet of 16 bits once per second at a bit rate of 62.5 kilobits per second. The 16 bits may consist of five bits for the sensor's ID, followed by ten bits for the value of the light sensor, followed by one stop bit—if more than thirty two sensors are needed per home, or if more granularity is desired in the sensor reading, additional bits can easily be added to the transmission packet as appropriate.

The 27 MHz radio 35 operates on just 1.5 mA at 1.2 V (this is in addition to the 165 pA used by the microcontroller 34). The microcontroller 34 is programmed to transmit a sensor reading once per second and to shut off the oscillator 36 during the interim sleep period, making the sensor's duty cycle 0.941 milliseconds. With the amplifier 38 and oscillator 36 used, the transmit power was actually more than sufficient to be sensed everywhere in the test house, and so the power draw could actually be reduced by utilizing more efficient oscillators and amplifiers. The disclosed wireless sensor platform is able to be sensed throughout a building with approximately 6.3 pA average current draw.

Figure 7:
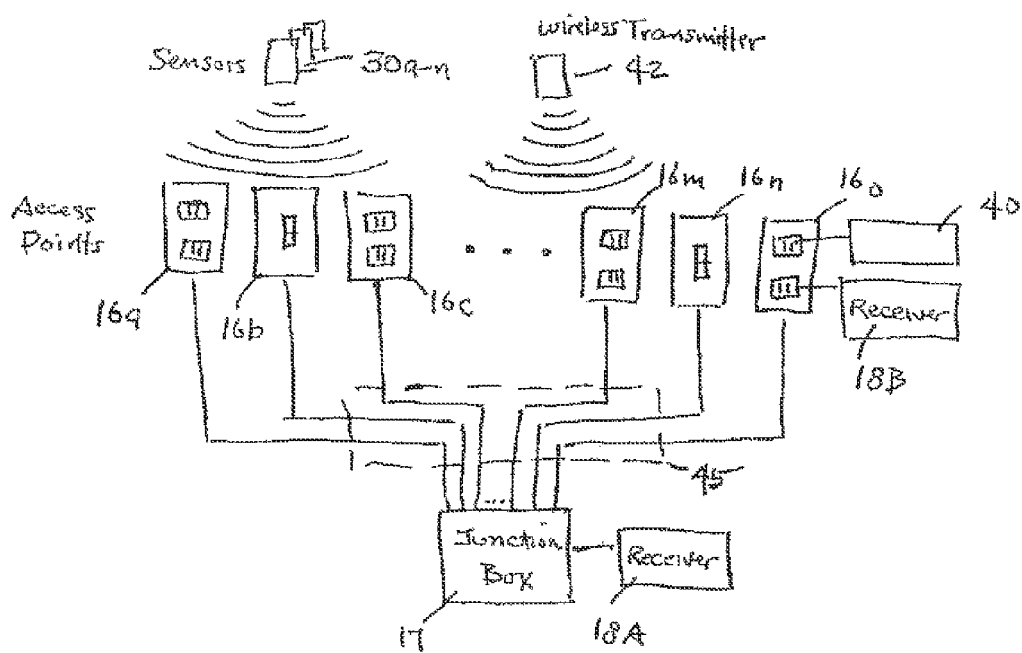
FIG. 7 illustrates conceptually the relationship of one or more sensors and/wireless transmitting devices to multiple power line access points and one or more receivers the power line infrastructure in accordance with the disclosure.

FIG. 7 illustrates conceptually the relationship of one or more sensors 30a-n and wireless transmitting devices 40 to multiple power line access points 16a-o and one or more receivers 18a-b coupled the power line infrastructure in accordance with the disclosure. Specifically, a plurality of sensors 30a-n and which may have the structure and functionality similar to sensor 30 of FIG. 6 are disposed about a structure 15, often times in different rooms and different levels of the structure, if you multilevel structure is utilized. Each of sensors 30a-n or wireless transmitter device 42 are disposed within its power transmission range to one of access points 16a-o which, in turn, are coupled through the power line infrastructure, indicated conceptually by box 45 in phantom in FIG. 7, to any of receivers 18A-B or 40, which are beyond the range of receiving any electromagnetic transmissions from either sensors 30a-n or wireless transmitter device 42. Yet, utilizing the system and he described herein, are able to communicate with their respective receivers. Specifically, any of sensors 30a-n transmit their respective packets within their respective transmission power range. Any access points 16a-o such ranges allow the RF signals to the incident upon the power line infrastructure. Receivers 18A-B which are electrically coupled to the power line infrastructure and receive the RF signals transduced by the power line infrastructure and may process your retransmit the received signals, as appropriate. A similar process occurs with a wireless transmitter 42 and its respective wireless receiver 40, as described herein. Note that sensors 30a-n and wireless transmitter 42 and their respective receivers should be transmitting within the same frequency band or range. As such, their respective antennas should be configured accordingly.

It will be obvious to those reasonably skilled in the relevant arts that other types of receivers may be utilized for receivers 18A-B or 40, including, but not limited to, receivers specifically designed for receiving signals within the specific frequency band(s) transmitted by the sensors 30 within the system, as well as any type of consumer electronic wireless receiver.

Two types of antennas were tested with the embodiment of sensor 30 FIG. 6. One was a CB antenna measuring 43 cm tall and the other a custom-built loop antenna measuring 6.5 cm long×6.5 cm wide×2 cm tall. The transmit power necessary for sensor data reception is a function of the efficiency of the antenna. Clearly the loop antenna has a size advantage in terms of enabling a compact form factor for in-home sensors, however both of these antennas are relatively small compared to the 11.06 m wavelength at 27.12 MHz, meaning that both are reasonably inefficient at this frequency. The efficiency of the power line as a receiving antenna at 27 MHz largely makes up for this, but since it is desirable to operate the sensors at as low a power output as possible so as to increase their lifespan, a more efficient antenna will allow a lower transmit power. Thus, longevity of the sensor is a direct tradeoff with antenna size. A sensor built around the larger 43 cm CB antenna was able to transmit at a power level of about 2 dB less on average in order to be detected with the same SNR as with the loop antenna.

Power line-based wireless sensors should be evaluated against existing wireless sensing technologies on two fronts—range and power efficiency. Communication range of wireless sensors is an important consideration since sensors must be able to communicate with a base-station to transmit readings. The primary model of enabling low power wireless sensor networks to date has been multi-hop mesh networking, wherein if a sensor can not directly communicate with a base-station, it forwards its readings through other sensors within range until the packet reaches the base-station. Although this potentially allows sensors to operate at a lower transmit power than if they had to directly reach the base-station, it also requires other sensors to receive data and then re-transmit it. Interestingly, the Texas Instruments CC2420, a popular 2.4 GHz ZigBee-compliant RF transceiver used in the Sun Microsystems SunSPOTs and Crossbow MicaZ wireless sensors, uses more power in receive mode (19.7 mA) than in transmit mode (17.4 mA @ 0 dBm).

To make a direct comparison between the power line-based sensors and existing sensor network technology, the communication range of two SunSPOT wireless sensors was tested within the test home. One SunSPOT continually transmitted packets at a power of −25 dBm, while the other continually listened for packets and flashed an LED when it received them. Signal level of −25 dBm was chosen since a power line connected receiver was able to detect a 27 MHz transmitter at that power level throughout the house (in fact, −35 dBm was sufficient power to sense a transmitter within 60 cm of a power line when using a power line connected receiver anywhere in the home). The transmitting SunSPOT was left in a fixed location (to simulate a fixed wireless sensor) and walked around the test home with the receiving SunSPOT (to test possible locations for the sensor base-station). At −25 dBm, while the power line-based sensors were able to be detected at any room in the home by connecting a receiver to the outlet, the SunSPOTs could generally only communicate within the same room. The SunSPOTs' range was also tested whether it could be extended by coupling to the power line (despite Sec. 2 showing that 2.4 GHz signals do not couple well over the power line) by placing both SunSPOTs near an outlet. This actually decreased their range. To give the SunSPOTs' whole-house coverage, their transmit power was increased to 0 dBm (1 mW).

Protocol Efficiency

Figure 8:
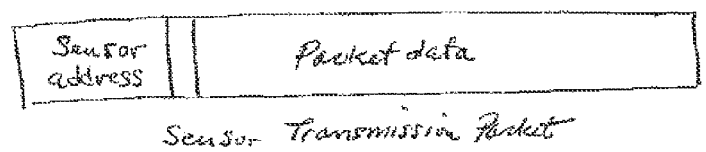
FIG. 8 illustrates conceptually one embodiment of the format of a transmission packet as disclosed herein.

Besides utilizing the power line to extend the range of the low-power sensors, an additional source of power efficiency is the low complexity of the data transmission protocol. As mentioned earlier, the power line-based sensors may be designed only to transmit sensor readings periodically and do not need to receive data or forward data for other sensors. This allows the data transmission protocol to be extremely simple. Instead of the 256 bits of overhead in every ZigBee packet, the disclosed protocol may be use, for example, only six bits of overhead (five bits for the sensor address and one stop bit), as illustrated in FIG. 8. Thus, although the disclosed sensor has a lower data transmission rate than Zigbee (62.5 kbps vs. 250 kbps), the time the transmitter must be active to transmit a 10 bit sensor reading is actually less for the disclosed power line-based sensor 30, thus requiring less energy.

A direct comparison metric for the two technologies is milliamp-hours per bit transmitted (mAh/bit) which can be calculated as shown in Equation 3:

$$\frac{\text{Number Of Bits}}{\text{bits/sec}} (RadioPower) \frac{1 \text{ hr}}{3600 \text{ sec}} \qquad (3)$$

This data was provided for the power line-based 27 MHz wireless sensors and for 2.4 GHz Zigbee sensors in Table 4 which shows two configurations for Zigbee: no mesh and mesh. No mesh is a more direct comparison with the disclosed technology since here only the power that a Zigbee-based sensor must use to transmit a 10-bit sensor reading with similar coverage to power line based sensing is counted. The mesh Zigbee configuration, however, considers that Zigbee may need to forward packets in a mesh network configuration from sensors not within direct communication range of the base station. These values account for a sensor that must receive a packet from one of the out-of-range sensors and then forward the packet on to the base station, in addition to sending one of its own packets with a sensor reading for each forwarded packet. These calculations show that the disclosed power line-based wireless sensors use just 2%-7% of the power that a Zigbee-based wireless sensor requires for similar coverage. In fact, the actual results are potentially better since this calculation does not account for the fact that on-off-keying uses no power when transmitting a zero and represents the power necessary to transmit 16 bits having a "1" value. Most transmissions will comprise a combination of "1"s and "0"s. Table 4 shows 27 MHz power line-based wireless sensing compared with 2.4 GHz Zigbee.

TABLE 4

|  | Power line | Zigbee (no mesh) | Zigbee (mesh) |
| --- | --- | --- | --- |
| Total bits for a 10-bit Sensor Reading | 16 | 272 | 544 |
| Bit Rate (kbps) | 62.5 | 250 | 250 |
| Transmit Current (mA) | 1.5 | 17.4 | 17.4 |
| Receive Current (mA) | — | — | 19.7 |
| mAh/bit | $1.07 \cdot 10^{-7}$ | $52.6 \cdot 10^{-7}$ | $164.7 \cdot 10^{-7}$ |
| % age of Power line-sensing | 100% | 4,930% | 15,442% |

At the current data rate of 62.5 kilobits per second, each sensor needs 0.03% of a second to transmit its data. When each sensor transmits a 16-bit packet once per second, this leads to a theoretical maximum of 3,906 sensors per home. The disclosed system currently utilizes what can be considered a uni-directional version of the ALOHA protocol for multiple access on the channel. Since sensors are not capable of receiving, the various sensors within a home transmit at different times so as not to interfere. This can be done reasonably well without synchronization when the number of sensors does not approach the theoretical maximum by having the sensors add a randomized delay each time to the one second interval between transmitting packets. Such randomized delay may be generated, for example, from a linear feedback shift register based pseudo-random sequence generator within the sensor which will not appreciably increase the cost of the apparatus.

Although the disclosed current data transmission protocol does not use encryption, the nature of the system has a basic level of physical security built-in. By utilizing extremely low transmit powers on the sensors, the reception range is greatly limited for anyone attempting to overhear the sensors from outside the home. Although, as with any wireless technology, these devices are susceptible to snooping with high-gain antennas, this is generally expensive and impractical as the operating frequency is reduced. The power line also has a natural security mechanism built-in in the form of transformers. Electric power is distributed at a higher voltage than is utilized in the home. Transformers convert this higher voltage to the voltage carried on the home power line. Transformers work well for low frequency signals like the 50-60 Hz power signal, but their high inductance causes them not to pass higher frequency signals like 27 MHz. Since one transformer can typically serve just a few homes, they act as a natural barrier to the sensors' signals propagating too far along the power line and being sensed by neighbors from within their homes.

Extending the Range of a Wireless Keyboard

The capabilities of the power line as a receiver over greater distances, ultimately as a communications infrastructure to augment low-power wireless devices throughout the entire home are demonstrated herein. In this alternative embodiment, several experiments with a software radio and a standard wireless keyboard operating at 27 MHz were performed. By coupling a receiver to the power line, the keyboard's range could be extended from 1.5-2 meters line-of-sight to non-line-of sight distances of up to approximately 30 m away, encompassing most locations within a 3-story 4,000 square foot/371 square meter home, all while maintaining the full functionality of the keyboard.

Figure 9:
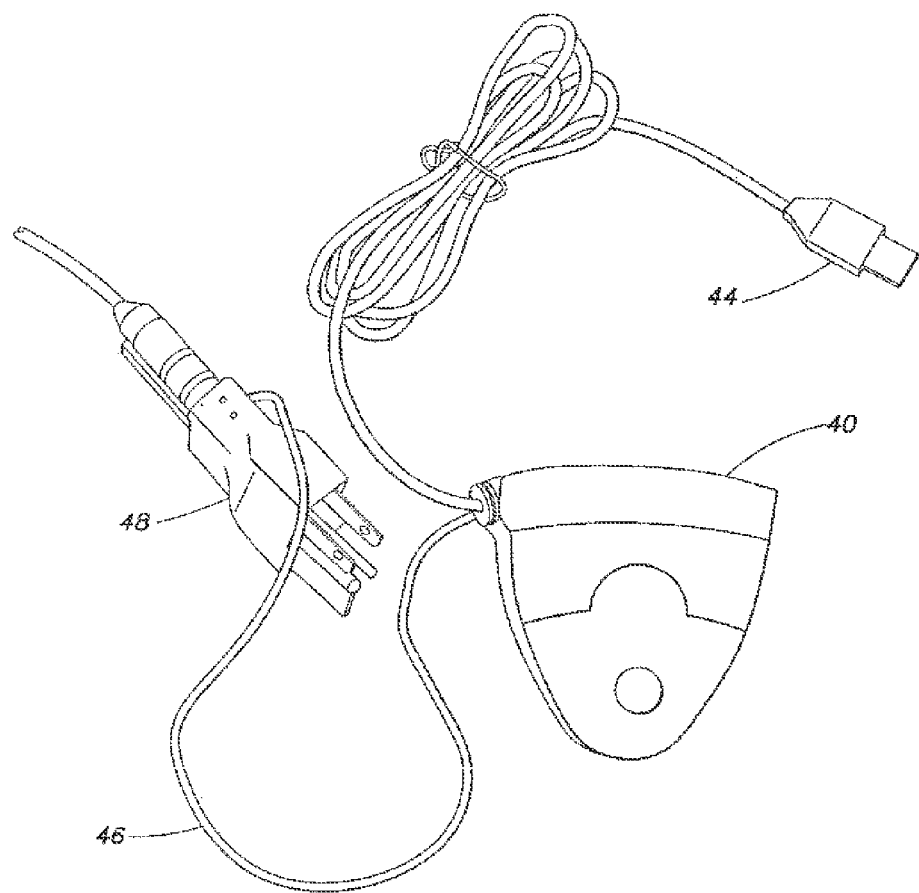
FIG. 9 illustrates a USB receiver for a wireless keyboard with its antenna coupled to the power line by wrapping it around a standard line cord.

A wireless keyboard 42 was used to test the capabilities of the home power line 45 as a receiving antenna since the keyboard in its standard configuration has a relatively short operational range of 1.5-2 meters. FIG. 9 illustrates a USB receiver for a wireless keyboard with its antenna 46 coupled to the power line by wrapping it around a standard line cord near the plug 48. A Logitech wireless keyboard and USB wireless receiver suitable for use with the system disclosed herein is commercially available from Logitech International S.A. Fremont, Calif. 94555. The wireless keyboard and receiver configured using a proprietary radio link operating at 27 MHz. The USB receiver 40 and antenna 46 are illustrated in FIG. 9. The wireless keyboard's receiver 40 connects to a computer via a standard USB connection.

The first experiments were conducted using a Universal Software Radio Peripheral (USRP) as the receiver. The USRP was capacitively coupled to the home power line at the basement electrical distribution panel by mounting an antenna inside of the panel door. It was thought that the distribution panel would be the optimal sensing location since all circuits in the house originate there. Thus, if the power line acts as a conduit for RF energy it picks up from the environment, it should channel those signals back to the distribution panel.

To sense the keyboard's signal, the USRP was tuned to 27 MHz and the FFT of the radio spectrum in that region observed. As keys were pressed, a spike at 27.146 MHz could be seen. The received signal strength of the keyboard using the power line as a receiving antenna was examined at twenty four locations spread throughout all floors and rooms of the test home. Of these twenty four, the keyboard's signal was visible at 20 locations. Conversely, without coupling the USRP's antenna to the power line at the distribution box, the keyboard could not be sensed at any of these locations.

While this method provided proof that the keyboard's signal could be received almost anywhere within the home using the power line as a receiving antenna, the question remained as to whether the signal-to-noise ratio (SNR) was great enough to decode the keyboard's signal accurately. While demodulation could also be performed with the USRP and appropriate software, the keyboard's modulation scheme was unknown and it was impractical result that the range of the keyboard could be extended using an expensive piece of sensitive radio equipment. The functionality of the keyboard's own receiver was tested when coupled to the power line. To couple the keyboard's receiver to the power line, an approximately fifty cm wire 46 was soldered to the antenna input location on its board. The other end of this wire was coiled around a standard electrical device cord plugged into a wall socket. This setup provides capacitive coupling to the power line similar to the coupling box 20 apparatus and method disclosed herein, while allowing the keyboard receiver 40 to be located in a more realistic setting away from the main distribution box and near the computer it is intended to operate.

In this scenario, "sensing" the keyboard was defined as the appropriate letters from the pressed keys appearing on screen. When testing the same twenty four locations within the test home with this receiver, although the keyboard itself could not be sensed at all the chosen locations, when moved in close proximity (within approximately fifty cm) to a power outlet, it could be successfully sensed at even the far end of the home. Thus, coupling of the keyboard's signal through the power lines extends the operational range of this keyboard from about two meters to anywhere with a power outlet in close proximity in the home. Tests with the USRP demonstrated that the keyboard's signal can in fact be sensed at those locations away from a power outlet where the keyboard's receiver failed to work. Therefore, any of numerous commercially available, inexpensive RF amplifiers can be employed to boost the signal coupled from the power line sufficiently for the keyboard receiver to accurately demodulate it in a manner understood by those reasonably skilled in the arts.

Power Lines as Antennas

Antennas are carefully designed for use at a specific frequency or range of frequencies. The dipole is a common type of antenna that is usually designed to be one half or one quarter the size of the wavelength of the frequency it will be used at. The power line was never intended to be used as an antenna, however, and so its radiation pattern at various frequencies will differ greatly from standard antennas. Some of the RF devices and services that have been successfully received using the power line as an antenna are shown, along with their associated frequencies and wavelengths, in Table 1. Note that half the wavelength of the wireless keyboard's signal is approximately five meters. There are likely many straight stretches of power wiring in the walls of a home that extend distances on the order of 5 meters. This may account for the success at using the power line to sense this low-power device.

To further validate the validity of the apparatus, systems and techniques disclosed herein, a validation of previous work on line cord antennas to aid in the reception of high-powered TV and radio broadcasts from outside the home was also performed. The signal strength of ten different TV and FM radio stations was measured by coupling the USRP to the power line. The received signal strength (RSS) for various over-the air broadcast television and FM radio stations was measured with a standard VHF television antenna, no antenna, and the power line as antenna with the receiver directly coupled to the power line. The power line measurements were compared to measurements taken with a standard TV VHF antenna (which also covers the FM radio band) and measurements taken without an antenna as a reference. Although the VHF antenna produces a higher signal strength at all ten stations tested, the power line antenna performs reasonably well by comparison. Various RF devices and services and their associated frequencies and wavelengths are illustrated in Table 5 below.

TABLE 5

| Device/Service | Frequency | Wavelength |
| --- | --- | --- |
| AM Radio | 520 kHz-1610 kHz | 932 m-288 m |
| Wireless keyboard | 27 MHz | 11.11 m |
| FM Radio | 88 MHz-108 MHz | 2.78 m-3.41 m |
| NTSC Analog Television | 54 MHz-806 MHz | 5.56 m-0.372 m |

One application of the in-home power line as a receiving antenna is for home wireless sensor networks. Current wireless sensor networks often use mesh networking as a means of extending the communication range of individual nodes. In a mesh network, wireless sensor nodes route packets for other nodes back to a central sink where all data from the sensor network is received and processed. In a mesh network configuration, sensor nodes are forced to constantly listen for and receive packets from neighboring nodes to forward them along.

The MicaZ is a popular wireless sensor network platform, commercially available from Crossbow Technologies, Milpitas, Calif. 95035, that operates at 2.4 GHz. The data sheet for the MicaZ reports that its RF transceiver draws between 11 and 17.4 mA when transmitting. Interestingly, the data sheet also reports that the RF transceiver draws more power when receiving –19.7 mA. Higher current draw for receiving is an important consideration when placing sensor nodes in a mesh configuration, as a mesh requires nodes to be in the high power receiving state often, as packets to be forwarded along arrive from neighboring nodes.

In contrast to the MicaZ, a current draw of 5 mA was measured when transmitting for the wireless keyboard utilized in the experiments. The keyboard operates on 3 V, and was designed to use two AA batteries. A typical alkaline AA battery has a capacity of 3,000 mAh, meaning that the keyboard could transmit continuously for 25 days. Wireless sensors typically only transmit periodically, however, so its life would in practice be significantly longer. In contrast, the MicaZ, even if only transmitting, and not receiving as required for a mesh network configuration, has a lifespan of 7 to 11 days when continuously transmitting.

Thus the power line as a potential conduit for RF signals from wireless sensor nodes within the home is contemplated. Rather than placing sensor nodes in a wireless mesh configuration, each node can simply transmit its own packets without need to forward along packets from neighboring nodes. The RF signal from each node will couple to the power line through nearby in-wall wiring and outlets. The signal can then be received at the sensor network sink, whose receiver is coupled to the power line via a line cord as illustrated in FIG. 9. This method eliminates the power expenditures necessary to receive and forward along packets from other nodes. Additionally, given that the transmitter of the tested wireless keyboard has a lower power draw than the MicaZ transceiver, yet could still be detected throughout the home, there is potential to use lower power transmitters than would otherwise have been possible with traditional antennas and over-the-air reception.

It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A system comprising:
   a receiver configured to electrically couple to a node of a conductive infrastructure, the receiver responsive to electromagnetic signals within a predetermined frequency band; and
   a source of electromagnetic signals configured to wirelessly transmit electromagnetic signals within the predetermined frequency band to an access point of the conductive infrastructure.

2. The system of claim 1, wherein the conductive infrastructure comprises an electric power line.

3. The system of claim 1, wherein the predetermined frequency band is between 1 MHz and 50 MHz.

4. The system of claim 1, wherein the predetermined frequency band is approximately 6.78 MHz.

5. The system of claim 1, wherein the predetermined frequency band is approximately 13.56 MHz.

6. The system of claim 1, wherein the predetermined frequency band is approximately 27.12 MHz.

7. The system of claim 1, wherein the predetermined frequency band is approximately 40.68 MHz.

8. The system of claim 1, wherein the predetermined frequency band is approximately 2.45 GHz.

9. The system of claim 1, wherein the source comprises:
   a transmitter; and
   a sensor operatively coupled to the transmitter.

10. The system of claim 9, wherein the sensor comprises a moisture sensor.

11. The system of claim 9, wherein the source is configured to transmit data packets with an average current draw of less than 100 μA per 1.2V.

12. The system of claim 9, wherein the source is configured to transmit data packets with an average current draw of less than 10 μA.

13. A system comprising:
   a receiver configured to electrically couple to a node of a conductive infrastructure, the receiver responsive to electromagnetic signals within a predetermined frequency band; and
   a plurality of sensors configured to wirelessly transmit electromagnetic signals within the predetermined frequency band to one or more access points of the conductive infrastructure.

14. The system of claim 13, wherein the conductive infrastructure comprises an electric power line.

15. The system of claim 13, wherein the predetermined frequency band is between 1 MHz and 50 MHz.

16. The system of claim 13, wherein the predetermined frequency band is approximately 13.56 MHz.

17. The system of claim 13, wherein the sensors comprise at least one moisture sensor.

18. The system of claim 13, wherein the sensors are configured to transmit data packets with an average current draw of less than 100 μA per 1.2V.

19. The system of claim 13, wherein the sensors are configured to transmit data packets with an average current draw of less than 10 μA.

20. The system of claim 13, wherein the node comprises a power outlet.

21. The system of claim 13, wherein the access points comprise at least one of: an electrical switch, an electrical outlet, a fuse box, a junction box, a conductive lead, and a circuit breaker panel.

22. A system comprising:
   a receiver configured to capacitively couple to an electrical node of a power line, the receiver responsive to electromagnetic signals within a predetermined frequency band; and
   a plurality of sensors configured to wirelessly transmit electromagnetic signals within the predetermined frequency band to one or more access points of the power line.

23. The system of claim 22, wherein the sensors are configured to transmit data packets with an average current draw of less than 100 μA per 1.2V.

24. The system of claim 22, wherein the node comprises a power outlet.

25. The system of claim 22, wherein the access points comprise at least one of: an electrical switch, an electrical outlet, a fuse box, a junction box, a conductive lead, or a circuit breaker panel.

* * * * *